US011487867B2

(12) United States Patent
Li

(10) Patent No.: US 11,487,867 B2
(45) Date of Patent: Nov. 1, 2022

(54) METHOD AND APPARATUS FOR CREATING VIRTUALIZED NETWORK FUNCTION INSTANCE

(71) Applicant: HUAWEI TECHNOLOGIES CO., LTD., Shenzhen (CN)

(72) Inventor: Fei Li, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 223 days.

(21) Appl. No.: 16/894,198

(22) Filed: Jun. 5, 2020

(65) Prior Publication Data

US 2020/0302051 A1   Sep. 24, 2020

Related U.S. Application Data

(63) Continuation of application No. PCT/CN2018/119337, filed on Dec. 5, 2018.

(30) Foreign Application Priority Data

Dec. 7, 2017  (CN) .......................... 201711283694.4

(51) Int. Cl.
*G06F 21/53* (2013.01)
*G06F 9/455* (2018.01)
(Continued)

(52) U.S. Cl.
CPC .......... *G06F 21/53* (2013.01); *G06F 9/45558* (2013.01); *G06F 21/602* (2013.01); *H04L 9/0825* (2013.01); *H04L 9/3236* (2013.01); *G06F 2009/45587* (2013.01); *G06F 2009/45595* (2013.01)

(58) Field of Classification Search
CPC .... G06F 21/53; G06F 21/602; G06F 9/45558; G06F 2009/45587; G06F 2009/45595; H04L 9/0825; H04L 9/3236
See application file for complete search history.

(56) References Cited

U.S. PATENT DOCUMENTS

2017/0111207 A1   4/2017  Yoon
2017/0161501 A1*  6/2017  Sood ................... G06F 9/45533
2019/0253264 A1*  8/2019  Singaravelu ............ H04L 9/321

FOREIGN PATENT DOCUMENTS

CN         104580208 A     4/2015
CN         105122738 B     6/2018
(Continued)

OTHER PUBLICATIONS

4G Americas NFV and SDN Networks—The Voice of 5G for the Americas, dated Nov. 2015, total 36 pages.
(Continued)

*Primary Examiner* — Elton Williams
(74) *Attorney, Agent, or Firm* — Hauptman Ham, LLP

(57) ABSTRACT

This application provides a method and an apparatus for creating a virtualized network function instance VNFI. The method includes: generating, by a hardware-mediated execution enclave HMEE in a network functions virtualization NFV system, a private-public key pair, where a to-be-instantiated VNFI is deployed in the NFV system, and the HMEE and a to-be-instantiated first virtualized network function component VNFC are deployed in the VNFI; sending a public key in the private-public key pair to a security control device; receiving an encrypted security credential from the security control device, where the encrypted security credential is obtained by encrypting a security credential of a package of the first VNFC based on the public key, and the security credential is used to decrypt the package of the first VNFC; and decrypting the encrypted security credential based on a private key in the private-public key pair, to obtain the security credential.

20 Claims, 4 Drawing Sheets

(51) Int. Cl.
  *G06F 21/60* (2013.01)
  *H04L 9/08* (2006.01)
  *H04L 9/32* (2006.01)

(56) References Cited

FOREIGN PATENT DOCUMENTS

| WO | 2015143651 A1 | 10/2015 |
|---|---|---|
| WO | 2015168913 A1 | 11/2015 |
| WO | 2015168914 A1 | 11/2015 |

OTHER PUBLICATIONS

Draft ETSI GR NFV-SEC 11 V0.0.13 (Dec. 2017),Network Functions Virtualisation (NFV);Security;Report on NFV LI Architecture[Release X],dated Dec. 5, 2017,total 52 pages.

International Search Report issued in corresponding International Application No. PCT/CN2018/119337 dated Mar. 7, 2019, State Intellectual Property Office of the P.R. China, Beijing, China.
ETSI GS NFV-SEC 003 V1.1.1."Network Functions Virtualisation (NFV); NFV Security; Security and Trust Guidance ",2014-12.total 57 pages.
Chinese Office Action issued in corresponding Chinese Application No. 201711283694.4, dated Jan. 29, 2021, pp. 1-9.
Chinese Search Report issued in corresponding Chinese Application No. 201711283694.4, dated Jan. 21, 2021, pp. 1-3.
"Network Functions Virtualisation ISG; Security and Trust Guidance NFV ISG Spec; GS NFV 004", Apr. 28, 2014, pp. 1-45, XP014202286.
European Search Report issued in corresponding European Patent Application No. 18886232.0, dated Dec. 14, 2020, pp. 1-10, European Patent Office, Munich, Germany.
Chinese Notice of Allowance issued in corresponding Chinese Application No. 201711283694.4, dated Mar. 25, 2022, pp. 1-4.

* cited by examiner

METHOD AND APPARATUS FOR CREATING VIRTUALIZED NETWORK FUNCTION INSTANCE

CROSS-REFERENCE TO RELATED APPLICATIONS

This application is a continuation of International Application No. PCT/CN2018/119337, filed on Dec. 5, 2018, which claims priority to Chinese Patent Application No. 201711283694.4, filed on Dec. 7, 2017, The disclosures of the aforementioned applications are hereby incorporated by reference in their entireties.

TECHNICAL FIELD

This application relates to the computer field, and more specifically, to a method and an apparatus for creating a virtualized network function instance.

BACKGROUND

A network functions virtualization (NFV) technology enables some network functions to be implemented on commodity hardware in a software manner. For example, in a telecommunications network, the NFV technology may be used to implement some telecommunications network functions in a universal cloud server, switch, and storage, to deploy a network service fast and efficiently.

Currently, there is an existing method for creating a virtualized network function instance (VNFI): After resources (which, for example, include a network resource, a compute resource, and a storage resource) used to create the VNFI are successfully requested, a virtual machine (VM) may be created on the requested resources, and then packages used to implement different functions are installed on the virtual machine, to create the VNFI for satisfying different service requirements. Usually, the VNFI may include one or more virtualized network function components (VNF Component, VNFC), and each VNFC may correspond to one service function. In some cases, it may be desired that some VNFCs are not visible to all. For example, to protect technical secrets of an enterprise, such as a core algorithm and a parameter, some VNFCs may be visible for use, but core algorithms and parameters internal to the VNFCs are confidential and kept unavailable for the ordinary business personnel. Therefore, a method needs to be provided to ensure security of a sensitive VNFC.

SUMMARY

This application provides a method and an apparatus for creating a VNFI, to improve security of a sensitive VNFC.

According to a first aspect, a method for creating a VNFI is provided, including:
  generating, by a hardware-mediated execution enclave HMEE in a network functions virtualization NFV system, a private-public key pair, where a to-be-instantiated VNFI is deployed in the NFV system, and the HMEE and a to-be-instantiated first virtualized network function component VNFC are deployed in the VNFI;
  sending, by the HMEE, a public key in the private-public key pair to a security control device;
  receiving, by the HMEE, an encrypted security credential from the security control device, where the encrypted security credential is obtained by encrypting a security credential of a package of the first VNFC based on the public key, and the security credential is used to decrypt the package of the first VNFC; and
  decrypting, by the HMEE, the encrypted security credential based on a private key in the private-public key pair, to obtain the security credential.

According to the foregoing technical solution, the private-public key pair is generated by the HMEE. This can ensure security of the private-public key pair, and prevent the private-public key pair from being obtained or tampered with by a third party. In addition, the security control device encrypts the security credential of the package of the first VNFC based on the public key of the private-public key pair, and the encrypted security credential can be decrypted only by using the private key generated by the HMEE, thereby ensuring security of the security credential during transmission. Further, a decryption process of the security credential is performed in a secure execution environment provided by the HMEE, so that the private key, the security credential, and the package of the first VNFC are unavailable for the outside, decryption of the security credential is invisible to the outside, and therefore an installation process of the first VNFC is invisible to the outside. In this way, security of the first VNFC can be ensured.

With reference to the first aspect, in some implementations of the first aspect, an instantiated second VNFC is deployed in the VNFI; and
  the sending, by the HMEE, a public key in the private-public key pair to a security control device includes:
  sending, by the HMEE, the public key in the private-public key pair to the security control device by using the second VNFC; and
  the receiving, by the HMEE, an encrypted security credential from the security control device includes:
  receiving, by the HMEE, the encrypted security credential from the security control device by using the second VNFC.

To further ensure a secure execution environment of the HMEE, an interface of the HMEE may be defined as being capable of communicating only with a common VNFC (for example, the second VNFC) in the VNFI, and the common VNFC is used for forwarding information sent by the HMEE or forwarding information to the HMEE.

With reference to the first aspect, in some implementations of the first aspect, the method further includes:
  receiving, by the HMEE, an instantiation complete message from the second VNFC.

After instantiation of the second VNFC, a communication connection relationship with the MANO is established, and then the second VNFC is capable of forwarding information to the HMEE.

With reference to the first aspect, in some implementations of the first aspect, the method further includes:
  sending, by the HMEE, an identifier of the first VNFC to the security control device.

In some cases, the security control device may manage identifiers of a plurality of sensitive VNFCs, and therefore may encrypt, based on an identifier of a VNFC, a security credential of a package of the corresponding VNFC and then send the encrypted security credential.

Optionally, the sending, by the HMEE, an identifier of the first VNFC to the security control device includes:
  sending, by the HMEE, the identifier of the first VNFC to the security control device by using the second VNFC.

With reference to the first aspect, in some implementations of the first aspect, the method further includes:

sending, by the HMEE, a hash of the public key to the security control device.

To avoid a possible security risk that is caused because the public key is tampered with by a third party during transmission, the security control device may perform integrity verification on the received public key based on the hash of the public key, and deliver the security credential when the verification succeeds, thereby ensuring secure delivery of the security credential.

Optionally, the sending, by the HMEE, a hash of the public key to the security control device includes:
sending, by the HMEE, the hash of the public key to the security control device by using the second VNFC.

With reference to the first aspect, in some implementations of the first aspect, the method further includes:
sending, by the HMEE, a host identifier and/or a hash of code to the security control device, where the host identifier is an identifier of a host on which the HMEE is installed, and the code is code executed by the HMEE.

The security control device may perform authentication on the host identifier and/or the code, to exclude a possibility that a third party (for example, a device that is not authenticated by the security control device) masquerades as the HMEE to send the public key, or that a third party controls the HMEE and uses unauthorized code attempt to obtain the security credential from the security control device. The security credential is delivered only when the host identifier and/or the code are/is successfully authenticated, to ensure secure delivery of the security credential.

Optionally, the sending, by the HMEE, a host identifier and/or a hash of code to the security control device includes:
sending, by the HMEE, the host identifier and/or the hash of the code to the security control device by using the second VNFC.

According to a second aspect, a method for creating a VNFI is provided, including:
receiving, by a security control device, a public key from a hardware-mediated execution enclave HMEE in a network functions virtualization NFV system, where a to-be-instantiated VNFI is deployed in the NFV system, and the HMEE and a to-be-instantiated first virtualized network function component VNFC are deployed in the VNFI;
encrypting, by the security control device, a security credential of a package of the first VNFC based on the public key, to obtain an encrypted security credential, where the security credential is used to decrypt the package of the first VNFC; and
sending, by the security control device, the encrypted security credential to the HMEE.

According to the foregoing technical solution, the private-public key pair is generated by the HMEE. This can ensure security of the private-public key pair, and prevent the private-public key pair from being obtained or tampered with by a third party. In addition, the security control device encrypts the security credential of the package of the first VNFC based on the public key of the private-public key pair, and the encrypted security credential can be decrypted only by using the private key generated by the HMEE, thereby ensuring security of the security credential during transmission. Further, a decryption process of the security credential is performed in a secure execution environment provided by the HMEE, so that the private key, the security credential, and the package of the first VNFC are unavailable for the outside, decryption of the security credential is invisible to the outside, and therefore an installation process of the first VNFC is invisible to the outside. In this way, security of the first VNFC can be ensured.

With reference to the second aspect, in some implementations of the second aspect, an instantiated second VNFC is deployed in the VNFI; and
the receiving, by a security control device, a public key from an HMEE in an NFV system includes:
receiving, by the security control device, the public key from the HMEE in the NFV system by using the second VNFC in the NFV system; and
the sending, by the security control device, the encrypted security credential to the HMEE includes:
sending, by the security control device, the encrypted security credential to the HMEE by using the second VNFC.

To further ensure a secure execution environment of the HMEE, an interface of the HMEE may be defined as being capable of communicating only with a common VNFC (for example, the second VNFC) in the VNFI, and the common VNFC is used for forwarding information sent by the HMEE or forwarding information to the HMEE.

With reference to the second aspect, in some implementations of the second aspect, the method further includes:
receiving, by the security control device, an identifier of the first VNFC from the HMEE.

In some cases, the security control device may manage identifiers of a plurality of sensitive VNFCs, and therefore may encrypt, based on an identifier of a VNFC, a security credential of a package of the corresponding VNFC and then send the encrypted security credential.

Optionally, the receiving, by the security control device, an identifier of the first VNFC from the HMEE includes:
receiving, by the security control device, the identifier of the first VNFC from the HMEE by using the second VNFC.

With reference to the second aspect, in some implementations of the second aspect, the method further includes:
receiving, by the security control device, a hash of the public key from the HMEE;
verifying, by the security control device, the public key based on the received public key and hash of the public key; and
the encrypting, by the security control device, a security credential based on the public key includes:
encrypting, by the security control device, the security credential based on the public key when the public key is successfully verified.

To avoid a possible security risk that is caused because the public key is tampered with by a third party during transmission, the security control device may perform integrity verification on the received public key based on the hash of the public key, and deliver the security credential when the verification succeeds, thereby ensuring secure delivery of the security credential.

Optionally, the receiving, by the security control device, a hash of the public key from the HMEE includes:
receiving, by the security control device, the hash of the public key from the HMEE by using the second VNFC.

With reference to the second aspect, in some implementations of the second aspect, the method further includes:
authenticating, by the security control device, the HMEE; and
the sending, by the security control device, the encrypted security credential to the HMEE includes:

sending, by the security control device, the encrypted security credential to the HMEE when the HMEE is successfully authenticated.

To avoid that the security credential is obtained by a third party, authentication may be performed on the HMEE, and the security credential is delivered only when the authentication succeeds, thereby ensuring secure delivery of the security credential.

With reference to the second aspect, in some implementations of the second aspect, the authenticating, by the security control device, the HMEE includes:

receiving, by the security control device, a host identifier and/or a hash of code from the HMEE, where the host identifier is an identifier of a host on which the HMEE is configured, and the code is code executed by the HMEE; and authenticating, by the security control device, the HMEE based on the host identifier and/or the hash of the code, where the security control device prestores an identifier of an authenticated host and/or code allowed to be executed.

The security control device may perform authentication on the host identifier and/or the code, to exclude a possibility that a third party (for example, a device that is not authenticated by the security control device) masquerades as the HMEE to send the public key, or that a third party controls the HMEE and uses unauthorized code to attempt to obtain the security credential from the security control device. The security credential is delivered only when the host identifier and/or the code are/is successfully authenticated, to ensure secure delivery of the security credential.

Optionally, the receiving, by the security control device, a host identifier and/or a hash of code from the HMEE includes:

receiving, by the security control device, the host identifier and/or the hash of the code from the HMEE by using the second VNFC.

According to a third aspect, an apparatus for creating a VNFI is provided, including units configured to perform the method in the first aspect or any possible implementation of the first aspect.

According to a fourth aspect, an apparatus for creating a VNFI is provided, including units configured to perform the method in the second aspect or any possible implementation of the second aspect.

According to a fifth aspect, an apparatus for creating a VNFI is provided, including a communications interface, a processor, and a memory, where the processor is configured to control the communications interface to receive and send a signal, the memory is configured to store a computer program, and the processor is configured to invoke the computer program from the memory and run the computer program, so that the apparatus performs the method in the first aspect or any possible implementation of the first aspect.

According to a sixth aspect, an apparatus for creating a VNFI is provided, including a communications interface, a processor, and a memory, where the processor is configured to control the communications interface to receive and send a signal, the memory is configured to store a computer program, and the processor is configured to invoke the computer program from the memory and run the computer program, so that the apparatus performs the method in the second aspect or any possible implementation of the second aspect.

According to a seventh aspect, a computer program product is provided, where the computer program product includes computer program code, and when the computer program code is run on an apparatus for creating a VNFI, the apparatus is enabled to perform the method in the first aspect or any possible implementation of the first aspect.

According to an eighth aspect, a computer program product is provided, where the computer program product includes computer program code, and when the computer program code is run on an apparatus for creating a VNFI, the apparatus is enabled to perform the method in the second aspect or any possible implementation of the second aspect.

According to a ninth aspect, a computer-readable medium is provided. The computer-readable medium stores program code, and the program code includes an instruction used to perform the method in the first aspect or any possible implementation of the first aspect.

According to a tenth aspect, a computer-readable medium is provided. The computer-readable medium stores program code, and the program code includes an instruction used to perform the method in the second aspect or any possible implementation of the second aspect.

DESCRIPTION OF EMBODIMENTS

Figure 1:
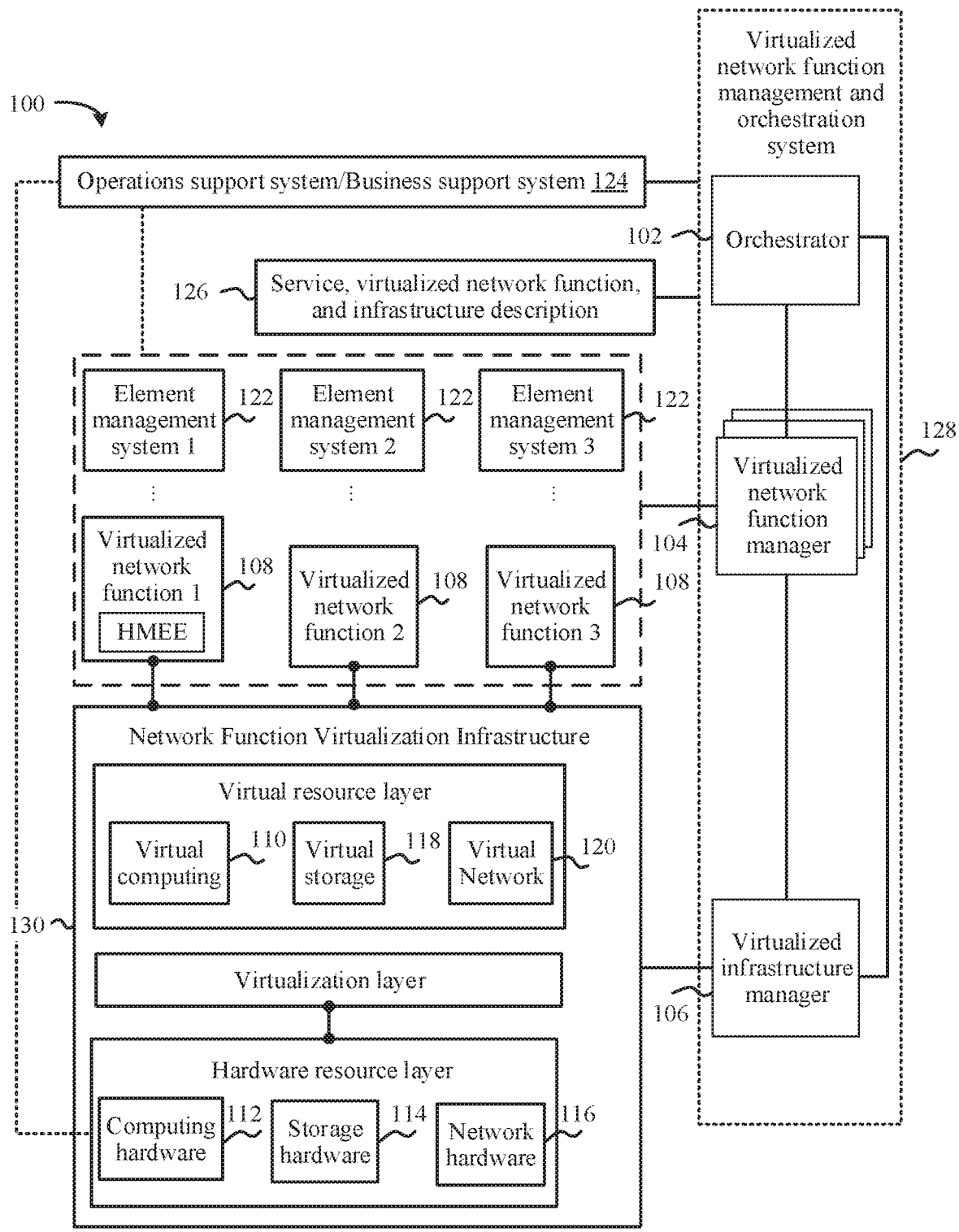
FIG. 1 is a schematic architectural diagram of an NFV system applicable to a method and an apparatus for creating a VNFI according to an embodiment of this application.

The following describes technical solutions of this application with reference to the accompanying drawings.

The technical solutions of the embodiments of this application may be applied to various communications systems, such as a global system for mobile communications (GSM), a code division multiple access (CDMA) system, a wideband code division multiple access (WCDMA) system, a general packet radio service (GPRS), a long term evolution (LTE) system, an LTE frequency division duplex (FDD) system, LTE time division duplex (TDD), a universal mobile telecommunications system (UMTS), a worldwide interoperability for microwave access (WiMAX) communications system, a future 5th generation (5G) system, or a new radio (NR) system.

For ease of understanding the embodiments of this application, concepts related to this application are first briefly described.

Virtual machine: A virtual machine is a complete computer system emulated by software, having complete hardware system functions and running in a completely isolated environment. In other words, the virtual machine may be a virtual device emulated on a physical device by using virtual machine software. After a user logs in to a virtual machine system, all operations can be performed in an independent virtual system. For example, the user can independently install and run software, store data, have an independent desktop of the user, and access network resources. For application programs running on virtual machines, the virtual machines operate in the same way as real physical devices.

Virtualized network function (VNF): A VNF may also be referred to as a virtualized network element, and may correspond to a physical network function in a conventional non-virtualized network. The VNF may include a plurality of lower-level components. Optionally, one VNF may be deployed on one or more VMs.

Virtualized network function instance (VNF Instance, VNFI): A VNFI can be created after instantiation of a VNF. The instantiation herein may include: requesting resources (which, for example, include a compute resource, a network resource, and a storage resource), installing and running the VNFI on the requested resources, and completing related configuration on the related resources, and the like, so that the VNF can perform a corresponding function of the VNF on hardware. The VNFI is a result obtained after component machines have been instantiated and connected to each other. One VNFI may include one or more virtualized network function components (Virtualized Network Function Component, VNFC), and each VNFC may be carried on one or more VMs.

Virtualized network function component (VNF Component, VNFC): A VNFC is an internal component of the VNF. An instance of each VNFC may be mapped onto one or more VMs.

Hardware-mediated execution enclave (HMEE): An HMEE is an area of process space and memory within a host (for example, VM) system environment, and can implement an instruction related to the area and protect confidentiality and integrity of data. The HMEE may be implemented in a combination of software and hardware.

With reference to FIG. 1, the following describes in detail an NFV system applicable to a method and an apparatus for creating a VNFI according to an embodiment of this application.

FIG. 1 is a schematic architectural diagram of an NFV system 100 applicable to a method and an apparatus for creating a VNFI according to an embodiment of this application. The NFV system 100 may be run on a server. The server may include a processor, a hard disk, a memory, a system bus, and the like, and is similar to a general-purpose computer architecture. A function of the server may be implemented by one physical device, or by a cluster of physical devices. This is not limited in the embodiments of this application. In addition, the NFV system 100 may be implemented by using various networks, for example, a data center network, a service provider network, or a local area network (LAN, Local Area Network). As shown in FIG. 1, the NFV system 100 may include:

a management and orchestration system (MANO) 128;
an infrastructure (NFVI, NFV Infrastructure) 130;
a plurality of virtualized network functions (VNF) 108;
a plurality of element management systems (EMS) 122;
a service, VNF and infrastructure description 126; and
one or more operations support systems (OSS)/business support systems (BSS) 124.

The MANO 128 may include an orchestrator (NFV Orchestrator, NFVO) 102, one or more VNF managers (VNFM) 104, and one or more virtualized infrastructure managers (VIM) 106.

The NFVI 130 may include a hardware resource layer that includes computing hardware 112, storage hardware 114, and network hardware 116, a virtualization layer, and a virtual resource layer that includes virtual computing 110 (such as a virtual machine), virtual storage 118, and a virtual network 120. The computing hardware 112 may be a dedicated processor, or a general-purpose processor configured to provide processing and computing functions. The storage hardware 114 is configured to provide a storage capability. The storage capability may be provided by the storage hardware 114 (for example, a local memory of a server), or may be provided by using a network (for example, a server is connected to a network storage device by using a network). The network hardware 116 may be a switch, a router, and/or another network device. The network hardware 116 is configured to implement communication between a plurality of devices, where the plurality of devices are connected in a wireless or wired manner. The virtualization layer in the NFVI 130 is used to abstract a hardware resource in the hardware resource layer, and decouple the VNF 108 from a physical layer to which the hardware resource belongs, to provide a virtual resource for the VNF.

As shown in FIG. 1, virtual resources may include the virtual computing 110, the virtual storage 118, and the virtual network 120. The virtual computing 110 and the virtual storage 118 may be used to provide the virtual resource for the VNF 108 in a form of the virtual machine or another virtual container. For example, one or more VNFs 108 may be deployed on one or more virtual machines. The virtualization layer abstracts the network hardware 116 to form the virtual network 120. The virtual network 120, such as a virtual switch (Vswitch) is configured to implement communication between a plurality of virtual machines, or between a plurality of other types of virtual containers that carry VNFs. Virtualization of the network hardware may be implemented by using technologies such as a virtual LAN (VLAN), a virtual private local area network service (VPLS, Virtual Private LAN Service), a virtual extensible local area network (VxLAN), or network virtualization using generic routing encapsulation (NVGRE).

The OSS/BSS 124 is mainly oriented to a telecommunications operator, and provides an integrated network management and business operation function, including network management (such as fault monitoring and network information collection), charging management, customer service management, and the like. The service, VNF and infrastructure description 126 is described in detail in the standard ETSI GS NFV 002 v1.1.1. Details are not described herein in this embodiment of this application.

The MANO 128 may be configured to monitor and manage the VNF 108 and the NFVI 130. The NFVO 102 may communicate with the one or more VNFMs 104 to implement a resource-related request, send configuration information to the VNFM 104, and collect status information of the VNF 108. In addition, the NFVO 102 may further communicate with the VIM 106, to implement resource allocation, and/or implement exchange of configuration information and status information of a virtualized hardware resource. The VNFM 104 may be configured to manage one or more VNFs 108 and execute various management functions, for example, initialization, update, query, and/or termination of the VNFs 108. The VIM 106 may be configured to control and manage interaction between the VNFs 108 and the computing hardware 112, the storage hardware 114, the network hardware 116, the virtual computing 110, the virtual storage 118, and the virtual network 120. For example, the VIM 106 may be configured to allocate resources to the VNFs 108. The VNFM 104 and the VIM 106 may communicate with each other to exchange the configuration information and the status information of the virtualized hardware resource.

The NFVI 130 includes hardware and software, and the hardware and the software jointly create a virtualization environment to deploy, manage, and execute the VNFs 108. In other words, the hardware resource layer and the virtual resource layer are used to provide the VNFs 108 with virtual resources such as virtual machines and/or other forms of virtual containers.

As shown in FIG. 1, the VNFM 104 may communicate with the VNFs 108 and the EMSs 122, to perform VNF lifecycle management and exchange configuration/status information. The VNF 108 represents virtualization of at least one network function, and the network function is previously provided by a physical network device. In an implementation, the VNF 108 may be a virtualized mobility management entity (Mobility Management Entity, MME) node, configured to provide all network functions provided by a typical non-virtualized MME device. In another implementation, the VNF 108 may be configured to implement functions of some of the components provided by a non-virtualized MME device. One or more VNFs 108 may be deployed on one virtual machine (or one virtual container in another form). The EMS 122 may be configured to manage one or more VNFs.

Optionally, the VNF 108 may include an HMEE. The HMEE may be understood as software running on a virtual resource used to carry the VNF 108, to complete a corresponding function of the VNF 108. In other words, the HMEE may be understood as a VNFC in the VNF A function of the HMEE has been described in detail. In this application, the HMEE may be configured to perform steps in a method 200 below.

It should be understood that the foregoing descriptions of functions of modules are intended to help a person skilled in the art better understand the embodiments of this application, but are not intended to limit the scope of the embodiments of this application. This application does not exclude a possibility that the modules listed above have other functions or a possibility of adding or deleting a module in the VNF system.

In the embodiments of this application, each VNFI may be deployed on one or more VMs, to implement different network functions. One VNFI may include one or more VNFCs, and each VNFC may be mapped onto one or more VMs. When the VNFI is deployed on a plurality of VMs, the plurality of VMs are connected to each other. A specific connection manner may be the same as that in the prior art. For example, refer to a connection manner defined in a standard. Details are not described herein in this embodiment of this application.

One VNFI may include an insensitive VNFC. The insensitive VNFC may also be referred to as a common VNFC, and has a relatively low security requirement. The insensitive VNFC may be a VNFC visible to ordinary business personnel, or may be a VNFC that can be operated by ordinary business personnel. Optionally, the VNFI may further include a sensitive VNFC, and the sensitive VNFC has a relatively high security requirement. For example, some sensitive VNFCs are invisible to the ordinary business personnel, in other words, not perceived by the ordinary business personnel, and are available only to some particular persons. Although some sensitive VNFCs can be visible and available to the ordinary business personnel, core algorithms of the VNFCs may be confidential and kept unavailable for the ordinary business personnel.

However, an installation process of a sensitive VNFC is usually implemented by using a common VNFC. In other words, an instantiation process of a VNFC is entirely controlled by the common VNFC. However, security of the common VNFC is not high. If the common VNFC is attacked, for example, is maliciously controlled, security of the sensitive VNFC is affected. Therefore, a method needs to be provided to ensure security of the sensitive VNFC.

This application provides a method and an apparatus for creating a VNFI, so that a sensitive VNFC can be installed in a secure environment, to complete VNFI instantiation and meet a security requirement of the VNFC.

With reference to the accompanying drawings, the following describes in detail the method and the apparatus for creating a VNFI in this application.

Figure 2:
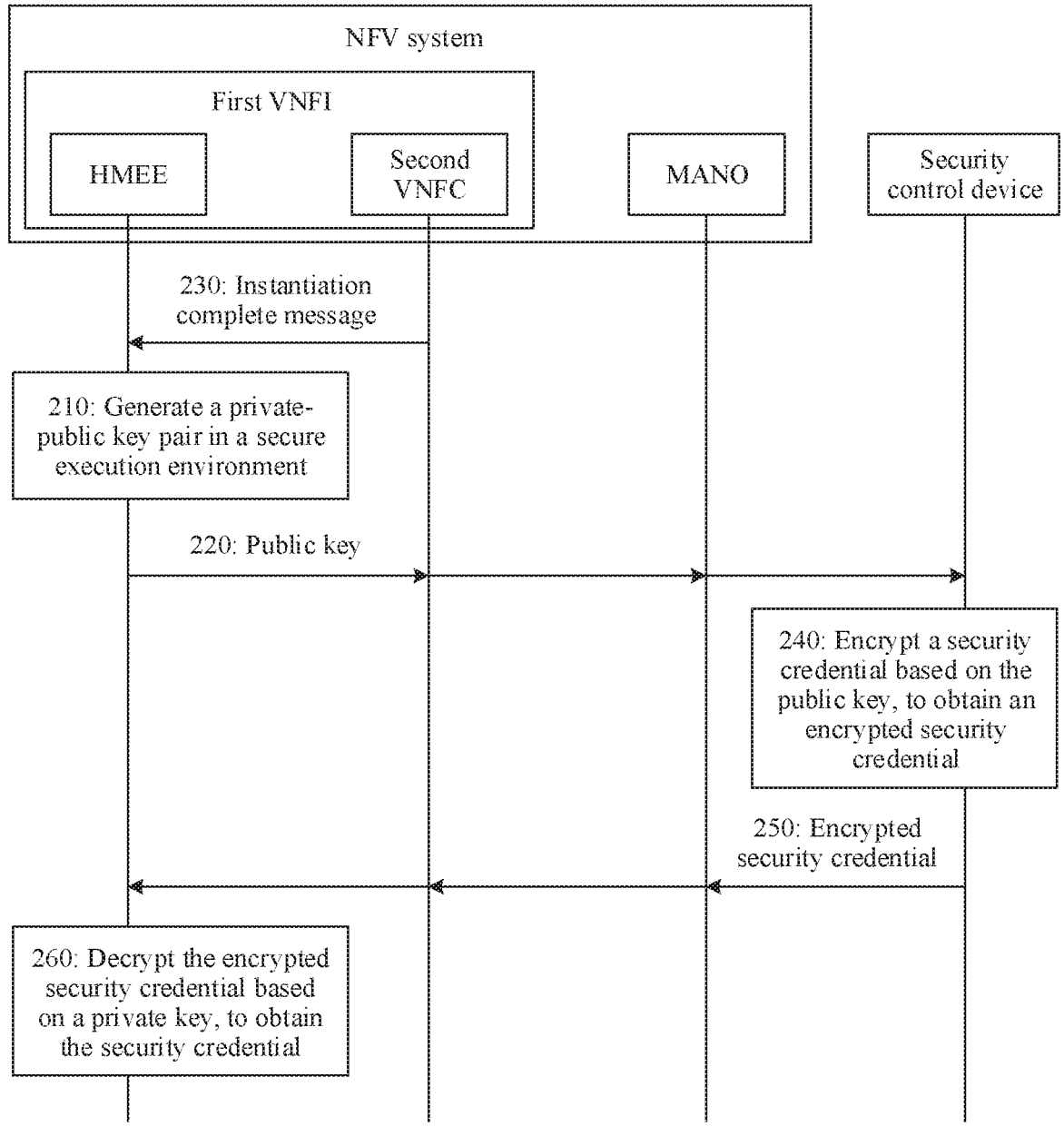
FIG. 2 is a schematic flowchart of a method for creating a VNFI according to an embodiment of this application.

FIG. 2 is a schematic flowchart of a method for creating a VNFI according to an embodiment of this application from the perspective of device interaction. The method 200 may be performed in a system including an NFV system and a security control device. One or more VNFIs may be deployed in the VNF system, and one or more VNFCs may be deployed in each VNFI. Herein, without loss of generality, an instantiation process of a first VNFC in a first VNFI in the NFV system is used as an example to describe in detail the method 200 for creating a VNFI in this application. The first VNFC may be a sensitive VNFC.

It should be noted that the NFV system may be the NFV system 100 shown in FIG. 1, and a function of the NFV system may be implemented by one physical device, or by a cluster of physical devices. An HMEE, a VNFC, and the like in the NFV system in this embodiment of this application may be understood as software running on different virtual machines. Resources (which, for example, include a network resource, a compute resource, and a storage resource) of the virtual machines may be provided by the one or more physical devices configured to run the NFV system. A processor in the physical device executes code stored in a memory, to perform corresponding functions of modules.

The following describes the method 200 in detail with reference to FIG. 2. As shown in FIG. 2, the method 200 includes steps 210 to 260.

Step 210: The HMEE generates a private-public key pair.

Specifically, the HMEE may be configured to provide a secure and trusted execution environment, and may be understood as a secure execution environment. The secure execution environment may be isolated from a non-secure execution environment by hardware. In other words, the secure execution environment and the non-secure execution environment may be understood as two operating environments that run on a same device. In the secure execution environment, running of an operating system, software, and the like may be considered as running on the background of the system and is invisible to a common user. Therefore, a resource in the environment can be protected from malicious software attacks and various security threats. Therefore, the secure execution environment can effectively ensure security of information and data, and an attacker cannot obtain or tamper with information or data stored in the secure execution environment. Optionally, the HMEE may be implemented by using Software Guard Extensions (SGX) technology of Intel.

It should be noted that the HMEE may load software onto a physical device (for example, a server) to implement a corresponding function of the HMEE. In addition to implementing the corresponding function of the HMEE, the device may also be configured to construct a plurality of VNFIs by using a virtualization technology, to implement a plurality of service functions.

It should be understood that the HMEE may be understood as an example of the secure execution environment, and shall not constitute any limitation on this application. The secure execution environment may alternatively be, for example, a trusted environment (Trusted Environment, TE).

Step 220: The HMEE sends, to a security control device, a public key in the private-public key pair generated in step 210.

In this embodiment of this application, the private-public key pair generated by the HMEE may include a public key and a private key that correspond to each other. The HMEE may send the public key to the security control device to request instantiation of the first VNFC, and store the private key in the HMEE. Because the HMEE can generate the private-public key pair in the secure execution environment and store the private key, the private key has relatively high security and cannot be easily attacked or tampered with by an attacker.

Correspondingly, in step 220, the security control device receives the public key from the HMEE.

In some cases, the HMEE may not be capable of external communication for security reasons. For example, an HMEE manufacturer may define an application programming interface (Application Programming Interface, API) interface as being capable of communicating only with a common VNFC in the NFV system but incapable of directly communicating with the security control device. In this case, the HMEE may forward the public key to the security control device by using a network element in the NFV system. Optionally, the first VNFI further includes a second VNFC, and the second VNFC may be an instantiated VNFC.

Optionally, step 220 specifically includes:
sending, by the HMEE, the public key to the security control device by using the second VNFC.

Correspondingly, the security control device receives the public key from the HMEE by using the second VNFC.

Further, after the second VNFC is created, the second VNFC will be initialized to establish a communication connection with the outside (specifically, a VNFM in a MANO), thereby completing instantiation of the second VNFC. Optionally, the method 200) further includes the following step:

Step 230: The second VNFC sends an instantiation complete message to the HMEE.

Correspondingly, in step 230, the HMEE receives the instantiation complete message sent by the second VNFC.

Then, in step 220, the HMEE may send the public key to the security control device by using the second VNFC. More specifically, the HMEE may send the public key to the second VNFC, the second VNFC may send the public key to the MANO (specifically, the VNFM in the MANO), and the MANO may forward the public key to the security control device.

It should be noted that the security control device herein may be understood as a third-party security control device, for example, may be a security controller (SC) or network security manager (NSM) defined in the European Telecommunications Standards Institute (ETSI) NFV SEC 013, or a credential manager (CM) of an operator.

It should be understood that specific forms, listed above, of the security control device are merely example descriptions, and shall not constitute any limitation on this application. Regardless of a specific form, in this embodiment of this application, the security control device may be configured to manage a security credential of a to-be-instantiated first VNFC. The security control device determines whether to deliver the security credential to the HMEE. In other words, the security control device determines whether to instantiate the first VNFC.

Step 240: The security control device encrypts a security credential of a package of the first VNFC based on the public key, to obtain an encrypted security credential.

The security credential may be used to encrypt the package of the first VNFC, for example, encrypt a part or all of code in the package of the first VNFC. The package of the first VNFC can be used to install the first VNFC only after being decrypted by using the security credential.

Step 250: The security control device sends the encrypted security credential to the HMEE.

Correspondingly, in step 250, the HMEE receives the encrypted security credential from the security control device.

Optionally, the security control device may forward the encrypted security credential to the HMEE by using the MANO and the second VNFC. Correspondingly, the HMEE receives the encrypted security credential from the security control device by using the MANO and the second VNFC.

In some cases, a same security control device may manage security credentials of a plurality of sensitive VNFCs, and each security credential corresponds to one VNFC. In addition, a same security control device may receive public keys from a plurality of HMEEs, or even a public key sent by a third party that masquerades as an HMEE. The security control device may perform authentication on a sender (that is, the HMEE) of the received information, to ensure secure delivery of the security credential. In addition, the public key may be tampered with due to attacks from the third party during transmission. The security control device may verify the public key before encrypting the security credential, to ensure secure delivery of the security credential.

Optionally, the method further includes: sending, by the HMEE, an identifier of the first VNFC to the security control device.

Correspondingly, the security control device receives the identifier of the first VNFC from the HMEE. The security control device may search for a corresponding security credential based on the identifier of the first VNFC, encrypt the security credential, and then send the encrypted security credential.

Optionally, the method further includes: sending, by the HMEE, a hash of the public key to the security control device.

Correspondingly, the security control device receives the hash of the public key from the HMEE. The hash of the public key may be used to perform integrity verification on the public key received in step 220. Therefore, step 250 may specifically include: encrypting, by the security control device, the security credential based on the public key when the verification succeeds. When the verification fails, the security control device may not deliver the security credential, for example, returns an empty message, a failure message, or a random message, to notify the HMEE that the security credential is not delivered. In this way, a possible security risk that is caused because the public key is being tampered with during transmission can be avoided. This ensures secure delivery of the security credential.

Optionally, the method further includes: sending, by the HMEE, a host identifier and/or a hash of code to the security control device. The host identifier is an identifier of a host on which the HMEE is installed, and the code is code executed by the HMEE.

Correspondingly, the security control device receives the host identifier and/or the hash of the code from the HMEE. The security control device performs, based on the host identifier and a prestored authenticated host identifier, authentication on the host on which the HMEE is installed. Therefore, step 250 may specifically include: delivering, by the security control device, the encrypted security credential to the HMEE when the host is successfully authenticated. When the host fails to be authenticated, the security control device may not deliver the security credential, for example, returns an empty message, a failure message, or a random message, to notify the HMEE that the security credential is not delivered. In this way, a possibility that another device masquerades as an HMEE to obtain the security credential from the security control device can be excluded. This ensures secure delivery of the security credential.

Alternatively, the security control device may perform, based on the hash of the code and prestored code that is allowed to be executed, authentication on the code executed by the HMEE. Therefore, step 250 may specifically include: delivering, by the security control device, the encrypted security credential to the HMEE when the code is successfully authenticated. When the code fails to be authenticated, the security control device may not deliver the security credential, for example, returns an empty message, a failure message, or a random message, to notify the HMEE that the security credential is not delivered. In this way, a possibility that the third party controls the host and uses unauthorized code to obtain the security credential from the security control device can be excluded. This ensures secure delivery of the security credential.

The security control device may perform authentication on both the host and the code. Therefore, step 250 may specifically include: delivering, by the security control device, the encrypted security credential to the HMEE when the host and the code are successfully authenticated; or not delivering, by the security control device, the encrypted security credential to the HMEE when at least one of the host and the code fails to be authenticated. Therefore, authentication can be performed from perspectives of hardware and software, to further improve security.

In a possible design, the public key, the identifier of the first VNFC, the hash of the public key, the host identifier, and the hash of the code may be carried in a same message (which, for example, is denoted as a first message). For example, the HMEE sends the first message to the security control device, so that the security control device completes integrity verification for the public key and authentication for the HMEE based on the received message, and then encrypts the security credential of the package of the first VNFC based on the public key.

It should be understood that specific information carried in the first message listed herein is merely an example description. In addition to the public key, the first message may further carry at least one of the following: the hash of the public key, the identifier of the first VNFC, the host identifier, and the hash of the code.

It should be further understood that a method for carrying the foregoing information by using the first message is merely a possible implementation. The information listed above may be sent to the security control device by using one or more messages. This is not limited in this application.

In a possible implementation, the hash of the public key, the identifier of the first VNFC, the host identifier, and the hash of the code may all be forwarded to the security control device by using the second VNFC.

After receiving the encrypted security credential from the security control device in step 250, the HMEE may perform step 260. To be specific, the HMEE decrypts the encrypted security credential based on a private key, to obtain the security credential.

Specifically, the HMEE may generate the private-public key pair by using an encryption algorithm, where the public key and the private key in the private-public key pair correspond to each other, and information encrypted by using the public key can be decrypted only by using the private key. Therefore, after the security control device encrypts the security credential based on the public key sent by the HMEE, the encrypted security credential can be decrypted only by using the private key in the HMEE. After generating the private-public key pair, the HMEE can store the private key in the HMEE. Because the HMEE is a secure environment, the private key cannot be obtained or tampered with by the third party. After receiving the encrypted security credential, the HMEE may decrypt the encrypted security credential based on the private key stored in the HMEE, to obtain the security credential.

Then, the HMEE may decrypt the package of the first VNFC based on the security credential, so that instantiation of the first VNFC is completed on a preconfigured virtual resource (for example, a VM). Optionally, the HMEE may delete the package of the first VNFC after the instantiation of the first VNFC. It should be understood that the instantiation process of the first VNFC may be the same as an instantiation process of a sensitive VNFC in the prior art. For brevity, detailed description of the process is omitted herein. After the instantiation of the first VNFC, the first VNFC may have a same function as the second VNFC, for example, may directly communicate with the outside. A function of the first VNFC is not limited in this application.

According to the foregoing technical solution, the security control device may encrypt the security credential of the package of the first VNFC based on the public key generated by the HMEE, where the encrypted security credential can be decrypted only by using the private key generated by the HMEE, thereby ensuring the security of the security credential during transmission. In addition, both the private-public key pair is generated and a decryption process is performed in the secure execution environment provided by the HMEE, so that the code of the first VNFC, the private key, and the security credential are unavailable for the outside, decryption of the security credential is invisible to the outside, and therefore an installation process of the first VNFC is invisible to the outside. In this way, security of the first VNFC can be ensured.

It should be noted that, in a process of transmitting the information shown in FIG. 2, the information is forwarded by the second VNFC and the MANO. However, it should be understood that forwarding by the second VNFC and the MANO may be only transparent transmission, and the information is not processed.

It should be understood that FIG. 2 shows only network elements in the embodiments of this application for ease of understanding. However, network elements in the NFV system are not limited to the network elements shown in FIG. 2. Therefore, the network elements shown in FIG. 2 shall not constitute any limitation on this application. For example, the MANO may include a VIM, the VNFM, and an NFVO. For another example, the NFV system may further include a third VNFC, and the like.

It should be understood that sequence numbers of the foregoing processes do not mean execution sequences in the embodiments of this application. The execution sequences of the processes should be determined based on functions and internal logic of the processes, and shall not constitute any limitation on an implementation processes of the embodiments of this application.

The foregoing describes in detail the method for creating the VNFI in the embodiments of this application with reference to FIG. 2. The following describes in detail an apparatus for creating a VNFI in the embodiments of this application with reference to FIG. 3 to FIG. 6.

Figure 3:
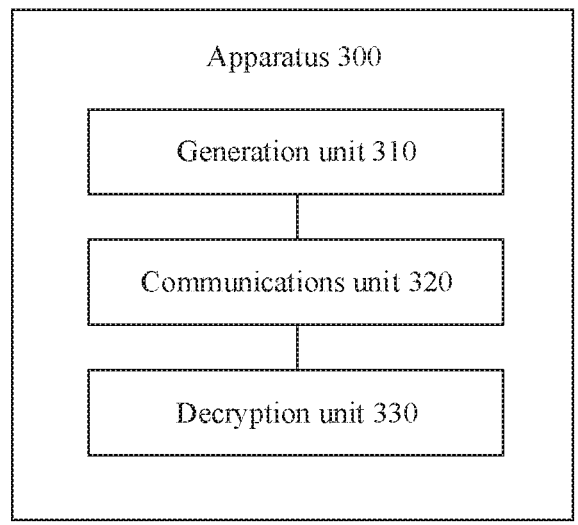
FIG. 3 is a schematic block diagram of an apparatus for creating a VNFI according to an embodiment of this application.

FIG. 3 is a schematic block diagram of an apparatus 300 for creating a VNFI according to an embodiment of this application. It should be understood that the apparatus 300 for creating the VNFI shown in FIG. 3 is merely an example. An apparatus for creating a VNFI in the embodiments of this application may further include another unit or module, or include units with functions similar to those of units in FIG. 3, or unnecessarily include all units in FIG. 3.

Specifically, the apparatus 300 is configured in a network functions virtualization NFV system, where a to-be-instantiated VNFI is deployed in the NFV system, and a device 500 and a to-be-instantiated first virtualized network function component VNFC are deployed in the VNFI. As shown in FIG. 3, the apparatus 300 may include a generation unit 310, a communications unit 320, and a decryption unit 330.

The generation unit 310 is configured to generate a private-public key pair.

The communications unit 320 is configured to send a public key in the private-public key pair to a security control device.

The decryption unit 330 is configured to decrypt an encrypted security credential based on a private key in the private-public key pair, to obtain a security credential.

It should be understood that the apparatus 300 for creating the VNFI in FIG. 3 may correspond to (for example, may be configured on or may be) the HMEE in the method for creating the VNFI in the foregoing embodiment. In addition, the foregoing and other operations and/or functions of the units of the apparatus 300 for creating the VNFI are intended to implement corresponding procedures of the method for creating the VNFI in FIG. 2. For brevity, details are not described herein again.

Figure 4:
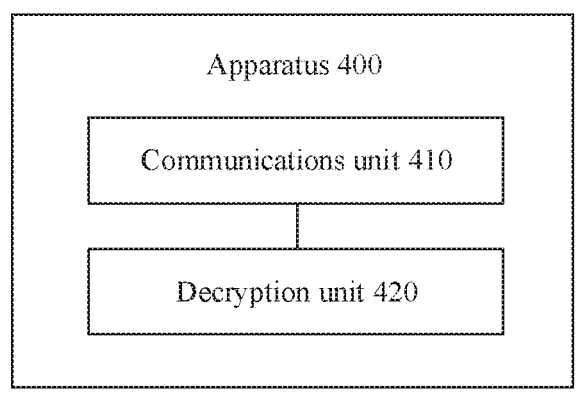
FIG. 4 is a schematic block diagram of an apparatus for creating a VNFI according to another embodiment of this application.

FIG. 4 is a schematic block diagram of an apparatus 400 for creating a VNFI according to another embodiment of this application. It should be understood that the apparatus 400X) for creating the VNFI in FIG. 4 is merely an example. An apparatus for creating a VNFI in the embodiments of this application may further include another unit or module, or include units with functions similar to those of units in FIG. 4, or unnecessarily include all units in FIG. 4.

Specifically, as shown in FIG. 4, the apparatus 400 may include a communications unit 410 and an encryption unit 420.

The communications unit 410 is configured to receive a public key from a hardware-mediated execution enclave HMEE in a network functions virtualization NFV system, where a to-be-instantiated VNFI is deployed in the NFV system, and the HMEE and a to-be-instantiated first virtualized network function component VNFC are deployed in the VNFI.

The encryption unit 420 is configured to encrypt a security credential of a package of the first VNFC based on the public key, to obtain an encrypted security credential, where the security credential is used to decrypt the package of the first VNFC.

The communications unit 410 is further configured to send the encrypted security credential to the HMEE.

It should be understood that the apparatus 400 for creating the VNFI in FIG. 4 may correspond to (for example, may be configured on or may be) the security control device in the method for creating the VNFI in the foregoing embodiment. In addition, the foregoing and other operations and/or functions of the units of the apparatus 400 for creating the VNFI are intended to implement corresponding procedures of the method for creating the VNFI in FIG. 2. For brevity, details are not described herein again.

Figure 5:
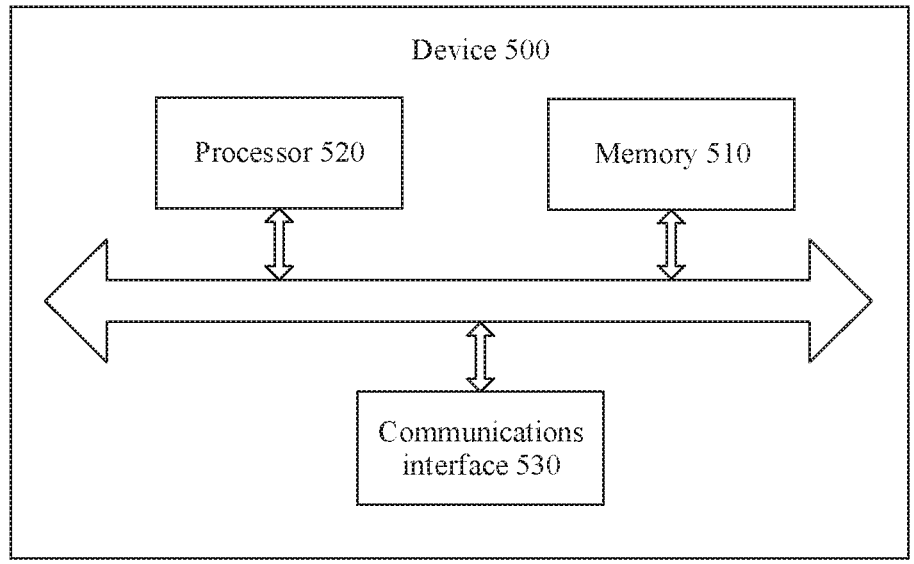
FIG. 5 is a schematic structural diagram of a device for creating a VNFI according to an embodiment of this application.

FIG. 5 is a schematic structural diagram of a device 500 for creating a VNFI according to an embodiment of this application. As shown in FIG. 5, the device 500 includes a memory 510, a processor 520, and a communications interface 530. The memory 510 may be integrated into the processor 520, or may be independent of the processor 520. The memory 510 may be configured to store an instruction, and the processor 520 may be configured to execute the instruction stored in the memory 510, to control the communications interface 530 to receive and send information or a signal. The memory 510, the processor 520, and the communications interface 530 may communicate with each other by using an internal connection path, to transfer a control signal and/or a data signal.

Specifically, the device 500 is configured in a network functions virtualization NFV system, where a to-be-instantiated VNFI is deployed in the NFV system, and the device 500 and a to-be-instantiated first virtualized network function component VNFC are deployed in the VNFI. The processor 520 of the device 500 may invoke program code stored in the memory 510 to perform the following operations:

generating a private-public key pair;
controlling the communications interface 530 to send a public key in the private-public key pair to a security control device;
controlling the communications interface 530 to receive an encrypted security credential from the security control device, where the encrypted security credential is obtained by encrypting a security credential of a package of the first VNFC based on the public key, and the security credential is used to decrypt the package of the first VNFC; and
decrypting the encrypted security credential based on a private key in the private-public key pair, to obtain the security credential.

It should be understood that the device 500 for creating the VNFI in FIG. 5 may correspond to (for example, may be configured on or may be) the HMEE in the method for creating the VNFI in the foregoing embodiment. In addition, the foregoing and other operations and/or functions of the units of the device 500 for creating the VNFI are intended to implement corresponding procedures of the method for creating the VNFI in FIG. 2. For brevity, details are not described herein again. In addition, the generation unit 310 and the encryption unit 320 of the apparatus 300 in FIG. 3 may correspond to the processor 520, and the communications unit 320 of the apparatus 300 in FIG. 3 may correspond to the communications interface 530.

Figure 6:
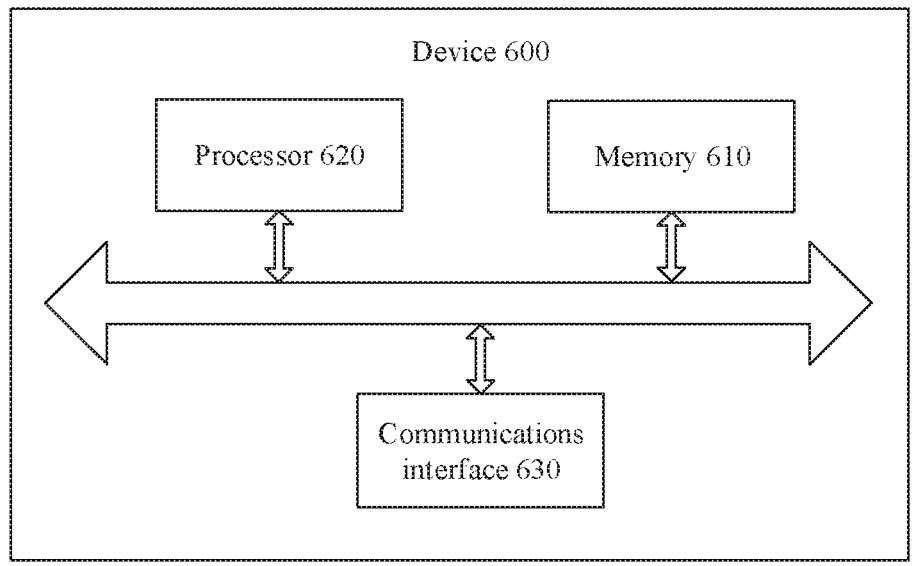
FIG. 6 is a schematic structural diagram of a device for creating a VNFI according to another embodiment of this application.

FIG. 6 is a schematic structural diagram of a device 600 for creating a VNFI according to another embodiment of this application. As shown in FIG. 6, the device 600 includes a memory 610, a processor 620, and a communications interface 630. The memory 610 may be integrated into the processor 620, or may be independent of the processor 620. The memory 610 may be configured to store an instruction, and the processor 620 may be configured to execute the instruction stored in the memory 610, to control the communications interface 630 to receive and send information or a signal. The memory 610, the processor 620, and the communications interface 630 may communicate with each other by using an internal connection path, to transfer a control signal and/or a data signal.

Optionally, the processor 620 may invoke program code stored in the memory 610 to perform the following operations:

controlling the communications interface 630 to receive a public key from a hardware-mediated execution enclave HMEE in a network functions virtualization NFV system, where a to-be-instantiated VNFI is deployed in the NFV system, and the HMEE and a to-be-instantiated first virtualized network function component VNFC are deployed in the VNFI;

encrypting a security credential of a package of the first VNFC based on the public key, to obtain an encrypted security credential, where the security credential is used to decrypt the package of the first VNFC; and controlling the communications interface 630 to send the encrypted security credential to the HMEE.

It should be understood that the device 600 for creating the VNFI in FIG. 6 may correspond to (for example, may be configured on or may be) the security control device in the method for creating the VNFI in the foregoing embodiment. In addition, the foregoing and other operations and/or functions of the units of the device 600 for creating the VNFI are intended to implement corresponding procedures of the method for creating the VNFI in FIG. 2. For brevity, details are not described herein again. In addition, the communications unit 410 of the apparatus 400 in FIG. 4 may correspond to the communications interface 630, and the encryption unit 420 of the apparatus 400 in FIG. 4 may correspond to the processor 620.

The processor in the embodiments of this application may be an integrated circuit chip, and is capable of signal processing. In an implementation process, steps in the foregoing method embodiment can be implemented by using a hardware integrated logical circuit in the processor, or by using instructions in a form of software. The processor may be a CPU, or may be another general purpose processor, a digital signal processor (DSP), an application-specific integrated circuit (ASIC), a field programmable gate array (FPGA) or another programmable logic device, a discrete gate or transistor logic device, or a discrete hardware component.

The processor may implement or perform the methods, the steps, and logical block diagrams that are disclosed in the embodiments of this application. The general purpose processor may be a microprocessor, or may be any conventional processor or the like. Steps of the method disclosed with reference to the embodiments of this application may be directly executed and accomplished by using a hardware decoding processor, or may be executed and accomplished by using a combination of hardware and software modules in a decoding processor. The software module may be located in a mature storage medium in the art, such as a random access memory, a flash memory, a read-only memory, a programmable read-only memory, an electrically erasable programmable memory, or a register. The storage medium is located in the memory, and a processor reads information in the memory and completes the steps in the foregoing methods in combination with hardware of the processor.

The memory in the embodiments of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (erasable PROM. EPROM), an electrically erasable programmable read-only memory (electrically EPROM, EEPROM), or a flash memory. The volatile memory may be a random access memory (RAM) and is used as an external cache. Through example but not limitative description, many forms of RAMs may be used, for example, a static random access memory (static RAM. SRAM), a dynamic random access memory (DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synch link DRAM, SLDRAM), and a direct ram bus random access memory (direct ram bus RAM, DR RAM).

A person of ordinary skill in the art may be aware that units and algorithm steps in the examples described with reference to the embodiments disclosed in this specification can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiment, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the method described in the embodiments of this application. The foregoing storage medium includes: various mediums that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for creating a virtualized network function instance (VNFI), comprising:
    generating, by a hardware-mediated execution enclave (HMEE) in a network functions virtualization (NFV) system, a private-public key pair, wherein a to-be-instantiated VNFI is deployed in the NFV system, and the HMEE and a to-be-instantiated first virtualized network function component (VNFC) are deployed in the VNFI;
    sending, by the HMEE, a public key in the private-public key pair to a security control device by way of an already instantiated second VNFC that is deployed in the VNFI;
    receiving, by the HMEE, an encrypted security credential from the security control device by way of the second VNFC, wherein the encrypted security credential is obtained by encrypting a security credential of a package of the first VNFC based on the public key;
    decrypting, by the HMEE, the encrypted security credential based on a private key in the private-public key pair, to obtain the security credential; and
    decrypting the package of the first VNFC based on the security credential,
    wherein the HMEE is isolated from communicating directly with the security control device.

2. The method according to claim 1, wherein the method further comprises:
    receiving, by the HMEE, an instantiation complete message from the second VNFC.

3. The method according to claim 1, wherein the method further comprises:
    sending, by the HMEE, an identifier of the first VNFC to the security control device by way of the second VNFC.

4. The method according to claim 1, wherein the method further comprises:
    sending, by the HMEE, a hash of the public key to the security control device by way of the second VNFC.

5. The method according to claim 1, wherein the method further comprises:
    sending, by the HMEE, one or more of a host identifier or a hash of code to the security control device by way of the second VNFC,
    wherein the host identifier is an identifier of a host on which the HMEE is installed, and the code is code executed by the HMEE.

6. A method for creating a virtualized network function instance (VNFI), comprising:
    receiving, by a security control device, a public key from a hardware-mediated execution enclave (HMEE) in a network functions virtualization (NFV) system, wherein
        a to-be-instantiated VNFI is deployed in the NFV system,
        the HMEE, a to-be-instantiated first virtualized network function component (VNFC) and an already instantiated second VNFC are deployed in the VNFI, and
        the public key is received by the security device by way of the second VNFC;
    encrypting, by the security control device, a security credential of a package of the first VNFC based on the public key, to obtain an encrypted security credential; and
    sending, by the security control device, the encrypted security credential to the HMEE by way of the second VNFC to facilitate decrypting the encrypted security credential based on a private key and decrypting the package of the first VNFC based on the security credential,
    wherein the HMEE is isolated from communicating directly with the security control device.

7. The method according to claim 6, wherein the method further comprises:
    receiving, by the security control device, an identifier of the first VNFC from the HMEE by way of the second VNFC.

8. The method according to claim 6, wherein the method further comprises:
    receiving, by the security control device, a hash of the public key from the HMEE by way of the second VNFC; and
    verifying, by the security control device, the public key based on the received public key and the received hash of the public key,
    wherein the encrypting, by the security control device, of the security credential based on the public key comprises:
        encrypting, by the security control device, the security credential based on the public key based on a determination that the public key is verified.

9. The method according to claim 6, wherein the method further comprises:
    authenticating, by the security control device, the HMEE,
    wherein the encrypted security credential is sent to the HMEE by way of the second VNFC based on a determination that the HMEE is authenticated.

10. The method according to claim 9, wherein the authenticating, by the security control device, of the HMEE comprises:
    receiving, by the security control device, one or more of a host identifier or a hash of code from the HMEE by way of the second VNFC, wherein the host identifier is an identifier of a host on which the HMEE is configured, and the code is code executed by the HMEE; and
    authenticating, by the security control device, the HMEE based on at least one of the host identifier or the hash of the code, wherein the security control device pre-stores one or more of an identifier of an authenticated host or code allowed to be executed.

11. An apparatus for creating a virtualized network function instance (VNFI), comprising:
a processor; and
a memory having computer readable instructions stored thereon that, when executed by the processor, cause the apparatus to:
generate a private-public key pair, wherein a to-be-instantiated VNFI is deployed in a network functions virtualization (NFV) system, and the to-be-instantiated first virtualized network function component (VNFC) is deployed in the VNFI;
send a public key in the private-public key pair to a security control device by way of an already instantiated second VNFC that is deployed in the VNFI;
receive an encrypted security credential from the security control device by way of the second VNFC, wherein the encrypted security credential is obtained by encrypting a security credential of a package of the first VNFC based on the public key;
decrypt the encrypted security credential based on a private key in the private-public key pair, to obtain the security credential; and
decrypt the package of the first VNFC based on the security credential,
wherein the HMEE is isolated from communicating directly with the security control device.

12. The apparatus according to claim 11, wherein the apparatus is further caused to:
receive an instantiation complete message from the second VNFC.

13. The apparatus according to claim 11, wherein the apparatus is further caused to:
send an identifier of the first VNFC to the security control device by way of the second VNFC.

14. The apparatus according to claim 11, wherein the apparatus is further caused to:
send a hash of the public key to the security control device by way of the second VNFC.

15. The apparatus according to claim 11, wherein the apparatus is further caused to:
send a host identifier and/or a hash of code to the security control device by way of the second VNFC, wherein the host identifier is an identifier of a host.

16. The apparatus according to claim 12, wherein the instantiation complete message is sent to the apparatus from the second VNFC in response to the second VNFC being created to establish a communication connection with the security control device.

17. The apparatus according to claim 16, wherein the instantiation complete message is sent to the apparatus before the public key is sent to the security control device.

18. The method according to claim 2, wherein the instantiation complete message is sent to the HMEE from the second VNFC in response to the second VNFC being created to establish a communication connection with the security control device.

19. The apparatus according to claim 18, wherein the instantiation complete message is sent to the HMEE before the public key is sent to the security control device.

20. The method according to claim 7, wherein the instantiation complete message is sent to the HMEE from the second VNFC in response to the second VNFC being created to establish a communication connection with the security control device.

* * * * *